United States Patent
Kuo

(10) Patent No.: US 10,444,343 B2
(45) Date of Patent: Oct. 15, 2019

(54) MOBILE NAVIGATION METHOD AND SYSTEM

(71) Applicant: Alpha Networks Inc., Hsinchu (TW)

(72) Inventor: Rong-Fa Kuo, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 340 days.

(21) Appl. No.: 15/340,350

(22) Filed: Nov. 1, 2016

(65) Prior Publication Data
US 2018/0031694 A1    Feb. 1, 2018

(30) Foreign Application Priority Data

Jul. 26, 2016  (TW) .............................. 105123578 A

(51) Int. Cl.
| | |
|---|---|
| *G01S 13/88* | (2006.01) |
| *G01S 13/06* | (2006.01) |
| *G05D 1/00* | (2006.01) |
| *G05D 1/02* | (2006.01) |

(52) U.S. Cl.
CPC .............. *G01S 13/88* (2013.01); *G01S 13/06* (2013.01); *G05D 1/0094* (2013.01); *G05D 1/0257* (2013.01); *G05D 2201/02* (2013.01)

(58) Field of Classification Search
CPC ....................................................... G01S 13/06
USPC ...................................................... 342/70–72
See application file for complete search history.

(56) References Cited

U.S. PATENT DOCUMENTS

| | | | | |
|---|---|---|---|---|
| 5,501,545 | A * | 3/1996 | Walter .................... | G02B 5/124 359/531 |
| 6,005,511 | A * | 12/1999 | Young ...................... | G01S 7/02 342/5 |
| 6,249,243 | B1* | 6/2001 | Takagi .................... | G01S 7/352 342/108 |
| 6,768,456 | B1 | 7/2004 | Lalezari et al. | |

(Continued)

FOREIGN PATENT DOCUMENTS

| | | |
|---|---|---|
| CN | 101694520 | 4/2010 |
| GB | 2463703 | 3/2010 |

(Continued)

OTHER PUBLICATIONS

European Patent Office, "European Search Report", dated Jul. 18, 2017.

*Primary Examiner* — Marcus E Windrich
(74) *Attorney, Agent, or Firm* — WPAT, PC

(57) ABSTRACT

A mobile navigation system includes a directive beamforming antenna carried by the vehicle, emitting first and second sensing beams in first and second directions at first and second time points, respectively; an electromagnetic wave reflector installed in the target zone, receiving the first and second sensing beams, and transmitting first and second retro waves back; and a processor electrically coupled to the directive beamforming antenna, receiving the first and second retro waves, and determining a direction where the vehicle will be guided to move according to information of the first and second retro waves. A coverage area of the first sensing beam and a coverage area of the second sensing beam partially overlaps with each other, and the direction where the vehicle will be guided to move lies between the first direction and the second direction.

11 Claims, 4 Drawing Sheets

(56) References Cited

U.S. PATENT DOCUMENTS

| | | | |
|---|---|---|---|
| 7,796,081 B2 * | 9/2010 | Breed | B60N 2/2863 340/435 |
| 8,928,523 B2 * | 1/2015 | Lee | G01S 7/023 342/159 |
| 10,051,411 B2 * | 8/2018 | Breed | G01C 21/3611 |
| 2004/0029558 A1 | 2/2004 | Liu | |
| 2008/0303718 A1 | 12/2008 | Chiang et al. | |
| 2011/0285593 A1 | 11/2011 | Cavirani et al. | |
| 2012/0289338 A1 | 11/2012 | Chen et al. | |
| 2013/0162460 A1 | 6/2013 | Aryanfar et al. | |
| 2013/0325243 A1 * | 12/2013 | Lipkowski | G05D 1/024 701/25 |
| 2014/0134963 A1 | 5/2014 | Aryanfar | |
| 2014/0176365 A1 | 6/2014 | Aryanfar et al. | |
| 2014/0266894 A1 | 9/2014 | Rasheed et al. | |
| 2015/0303581 A1 * | 10/2015 | Bodo | G01S 13/426 342/7 |
| 2016/0054441 A1 | 2/2016 | Kuo et al. | |
| 2018/0003792 A1 * | 1/2018 | McCafferty | G01S 1/042 |

FOREIGN PATENT DOCUMENTS

| | | |
|---|---|---|
| JP | 1990102481 | 4/1990 |
| JP | 1997189762 | 7/1997 |
| JP | 1998142322 | 5/1998 |
| JP | A-1999053030 | 2/1999 |
| JP | A-2001006100 | 12/2001 |
| JP | 2011128011 | 6/2011 |
| TW | 200625721 | 7/2006 |
| TW | 201126189 | 8/2011 |
| TW | 201511997 | 4/2015 |
| TW | 201607808 | 3/2016 |

\* cited by examiner

MOBILE NAVIGATION METHOD AND SYSTEM

FIELD OF THE INVENTION

The present invention relates to navigation means, and more particularly to mobile navigation method and system.

BACKGROUND OF THE INVENTION

Generally, an electronic radar positioning process is conducted by emitting an electromagnetic wave from an emitter and calculating relative distance and speed of a target object according information of a reflected electromagnetic wave, which is reflected from the target object back to the emitter. In practice, not only the target object but also other objects might reflect the electromagnetic wave. When the electromagnetically positioning process is performed in such an environment, detection errors are likely to occur since more than one reflected electromagnetic wave might be received. For example, if the radar positioning is implemented with a frequency-modulated continuous wave (FMCW), the scattering behavior of objects might happen to form multi-directional reflected waves, and different reflective paths would result in a multi-path electromagnetic wave. In the FMCW radar positioning method, electromagnetic waves in different paths would show different distances, so the multi-path electromagnetic wave would make the detection of the position of the target object unreliable.

SUMMARY OF THE INVENTION

Therefore, the present invention provides mobile navigation system for precisely guiding a vehicle toward a target zone.

In an aspect of the present invention, a mobile navigation system for guiding a vehicle toward a target zone, comprises: a directive beamforming antenna carried by the vehicle, emitting a first sensing beam in a first direction at a first time point and emitting a second sensing beam in a second direction at a second time point toward the target zone; an electromagnetic wave reflector installed in the target zone, receiving the first sensing beam and the second sensing beam, and transmitting a first retro wave corresponding to the first sensing beam back and a second retro wave corresponding to the second sensing beam back; and a processor electrically coupled to the directive beamforming antenna, receiving the first retro wave and the second retro wave, and determining a direction where the vehicle will be guided to move according to information of the first retro wave and information of the second retro wave. A coverage area of the first sensing beam and a coverage area of the second sensing beam partially overlaps with each other, and the direction where the vehicle will be guided to move lies between the first direction and the second direction.

In another aspect of the present invention, a mobile navigation method for guiding a vehicle toward a target zone, comprises: emitting a first sensing beam from the vehicle in a first direction at a first time point and emitting a second sensing beam from the vehicle in a second direction at a second time point toward the target zone, wherein a coverage area of the first sensing beam and a coverage area of the second sensing beam partially overlaps with each other; using an electromagnetic wave reflector installed in the target zone to receive the first sensing beam and the second sensing beam, and transmit a first retro wave corresponding to the first sensing beam and a second retro wave corresponding to the second sensing beam back; and receiving the first retro wave and the second retro wave, and determining a direction where the vehicle will be guided to move according to information of the first retro wave and information of the second retro wave. The direction where the vehicle will be guided to move lies between the first direction and the second direction.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
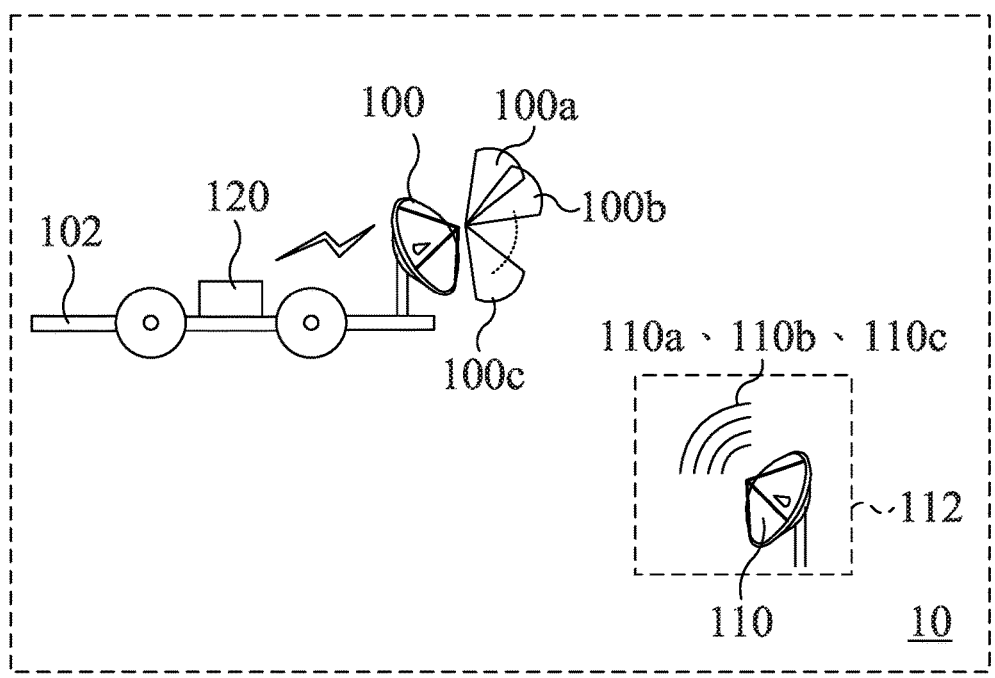
FIG. 1 is a functional block diagram schematically illustrating a mobile navigation system according to an embodiment of the present invention.

Please refer to FIG. 1, in which a mobile navigation system for guiding a vehicle according to an embodiment of the present invention is schematically shown. In this embodiment, the mobile navigation system 10 includes a directive beamforming antenna 100, a retro-directive antenna 110, and a processor 120. The directive beamforming antenna 100 is carried by the vehicle 102 and sequentially emits sensing beams 100a, 100b, 100c or more in a variety of directions. The retro-directive antenna 110, which is an antenna that transmits the signal back to where it came from, is installed in a target zone 112 for receiving one of the sensing beams which are emitted by the directive beamforming antenna 100, and in response to the received sensing beam, e.g. the wave 100a, returning a corresponding wave, which is so called as a retro wave, e.g. 110a, in a direction correlating to the direction of the wave 100a. Likewise, if the retro-directive antenna 110 receives the wave 100b or 100c, a corresponding retro wave, e.g. 110b or 110c, would be transmitted back in a direction correlating to the direction of the wave 100b or 100c. According to the information revealed by the returned retro wave, the vehicle 102 is guided toward the target zone 112.

In this embodiment, the directive beamforming antenna 100 changes emitting directions of sensing beams with time. For example, the directive beamforming antenna 100 emits a first sensing beam in a first direction at a first time point, and then emits a second sensing beam in a second direction at a second time point. The processor 120, which is carried by the vehicle 102 or disposed at a network node that can control the vehicle 102, and electrically coupled to the directive beamforming antenna 100 for receiving the retro wave 110a, 110b or 110c, processes the information revealed by the retro waves corresponding to the first sensing beam and the second sensing beam to determine the direction where the vehicle 102 will be guided.

The operating principle of the present invention will be described hereinafter, using the system, the flowchart, and the scheme as shown in FIGS. 1, 2A, 2B and 3 as examples. In the embodiment illustrated in FIG. 3, the major axial direction n of the directive beamforming antenna 100 is defined as a normal direction of the directive beamforming antenna 100, where the vehicle 102 will be guided to move, but the implementation of the present invention is not limited hereto. For example, the moving direction of the vehicle 102 may be different from the major axial direction n, and there could be a non-zero angle between the major axial direction n and the moving direction of the vehicle 102. Furthermore, the included angle between the major axial direction n and the moving direction of the vehicle 102 may dynamically change. For example, the directive beamforming antenna 100 may be rotatable, and the vehicle 102 will be guided in response to a received retro wave in a direction determined according to current orientation of the vehicle 102 and the major axial direction n of the directive beamforming antenna 100, which are recorded by the processor 120.

Figure 2A:
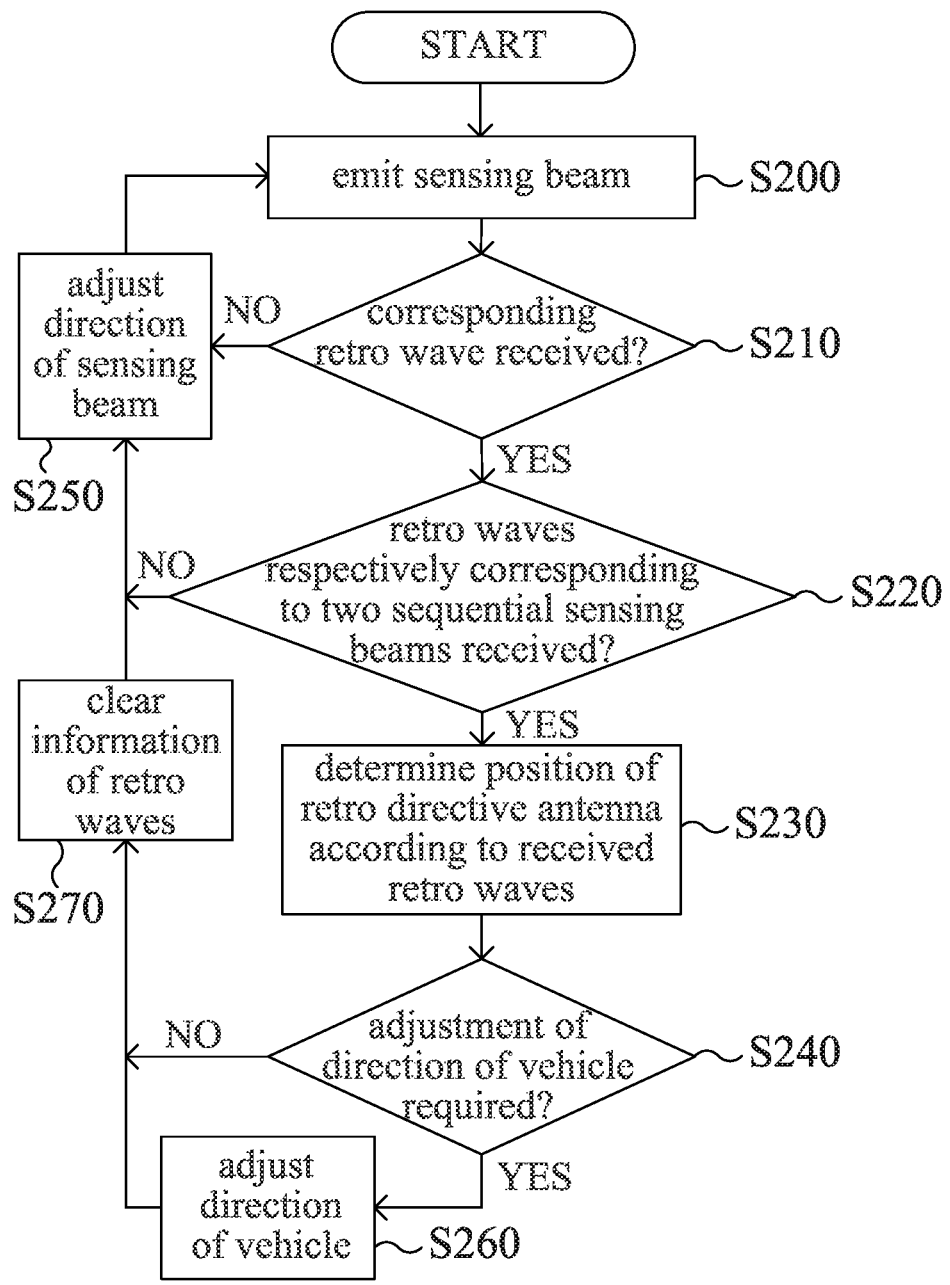
FIG. 2A is a schematic flowchart illustrating a mobile navigation method according to an embodiment of the present invention.

The flowchart of FIG. 2A schematically illustrates steps of a mobile navigation method based on the above-described operational principle according to an embodiment of the present invention. A sensing beam is first emitted at a specified time point (Step S200). Then in Step S210, whether a retro wave is received in response to the sensing beam is determined. If no retro wave in response to the sensing beam is received within a default period of time, wherein the default period of time is determined according to an intensity of the sensing beam and a detected area, proceed to Step S250 to adjust a direction of the sensing beam, and then to Step S200 to re-emit a sensing beam. The wave remission cycle will be repeated until a corresponding retro wave is received.

On the other hand, if a retro wave is received in Step S210, proceed to Step S220 to further check whether there is another retro wave in response to another emitted sensing beam is received or not. If no further retro wave is received, proceed to Step S250 to adjust a direction of the sensing beam. If two retro waves have been received, a position of the retro-directive antenna 110 can be derived according to the information carried by the two retro waves (Step S230). Once the position of the retro-directive antenna 110 is realized, whether the moving direction of the vehicle 102 need be changed can be determined (Step S240). If the moving direction of the vehicle 102 needs to be changed, necessary adjustment is made (Step S260). Otherwise, proceed to Step S270 to clear information of the retro waves (Step S270). Meanwhile, enter next operation cycle if necessary.

Figure 2B:
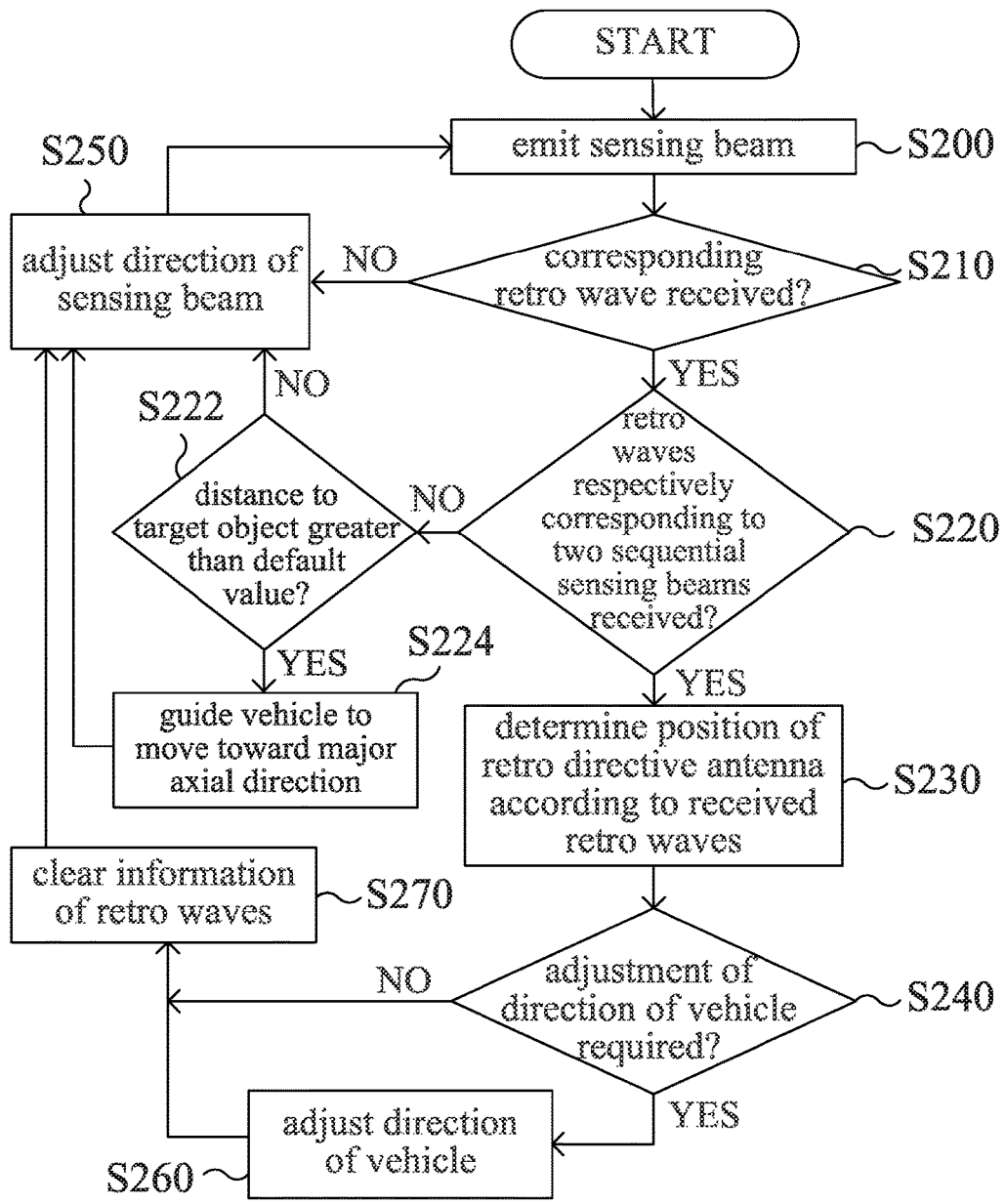
FIG. 2B is a schematic flowchart illustrating a mobile navigation method according to another embodiment of the present invention.
Figure 3:
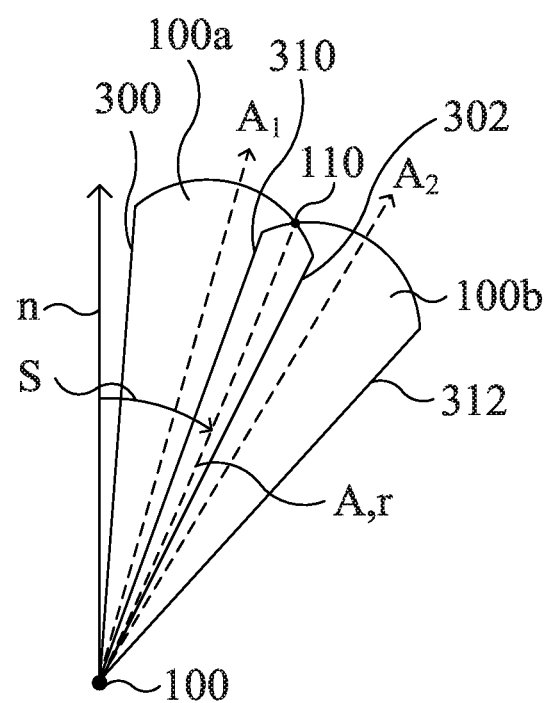
FIG. 3 is a schematic diagram exemplifying paths of wave beams for illustrating an operating principle according to the present invention.

Please refer to FIG. 2B, in which another embodiment of mobile navigation method according to the present invention is schematically illustrated. The steps included in this embodiment of mobile navigation method are similar to those illustrated in FIG. 2A except modifications between Step S220 and Step S250. In this embodiment, if there is no additional retro wave received in Step S220, a distance of a target object is estimated according to the information carried by the previously received retro wave, and compared with a default value (Step S222). If the distance of the target object is greater than the default value, guide the vehicle 102 to move toward the major axial direction n of the directive beamforming antenna 100 (Step S224), and subsequently, adjust the direction of the sensing beam (Step S250). If the distance of the target object is not greater than the default value, directly proceed to Step S250 to adjust the direction of the sensing beam.

It is to be noted that the major axial direction n of the directive beamforming antenna 100, i.e. the moving direction of the vehicle 102 in this embodiment, is not necessarily an orientation toward the retro-directive antenna 110. Instead, it is required that the sensing beam emitted in a specified direction at a specified time point can be transmitted back as a retro wave from the retro-directive antenna 110 within a default period of time. For example, as illustrated in FIG. 1, in which the directive beamforming antenna 100 rotates with time, the sensing beam 100a is emitted by the directive beamforming antenna 100. Then a retro wave 110a is returned to the directive beamforming antenna 100 from the retro-directive antenna 110 in response to the sensing beam 100a within a default period of time. Likewise, another sensing beam 100b is emitted by the directive beamforming antenna 100 just subsequent to the emission of the sensing beam 100a. Another retro wave 110b is returned to the directive beamforming antenna 100 from the retro-directive antenna 110 in response to the sensing beam 100b within the default period of time. Afterwards, the processor 120 processes the received wave signals and estimates a distance r between the directive beamforming antenna 100 and the retro-directive antenna 110 according to a time difference between the transmission of the sensing beam and the receiving of the retro wave.

Since both the retro wave corresponding to the sensing beam 100a emitted in a direction $A_1$ and the retro wave corresponding to the sensing beam 100b emitted in a direction $A_2$ are returned from the retro-directive antenna 110, it is inferable that the retro-directive antenna 110 is present at a position covered by a wave range of the sensing beam 100a and also a wave range of the sensing beam 100b. That is, the retro-directive antenna 110 must be disposed at an overlapping area of the wave ranges of the sensing beams 100a and 100b, as exemplified in FIG. 3. The term "wave range" used herein is defined as an area where an intensity of the sensing beam is high enough for the retro-directive antenna 110 to recognize. The wave range is generally a cone shape with projected edge lines 300 and 302 for the sensing beam 100a, and projected edge lines 310 and 312 for the sensing beam 100b. More specifically, the retro-directive antenna 110 is disposed at an intersection of a wavefront of the sensing beam 100a and a wavefront of the sensing beam 100b, and has an orientation A from the directive beamforming antenna 100.

With the two parameters, i.e. the orientation A and the distance r, the processor 120 can estimate the position of the retro-directive antenna 110. Subsequently, the processor 120 determines whether the moving direction of the vehicle 102 needs to change or not with reference to the current orientation of the vehicle 102 and one or more proper logic operations. If it is determined that the moving direction of the vehicle 102 does not follow an expected one, the moving direction of the vehicle will be adjusted, and the vehicle will be guided toward the expected direction. On the other hand, if it is determined that no adjustment is required, clear the information of the retro waves to avoid interference with operations in next cycle.

The above-mentioned "one or more proper logic operations" may be any proper algorithm or combination of algorithms applicable for navigation. For example, with reference to FIG. 1 and FIG. 3, when the orientation A is determined, the processor 120 may directly control the vehicle 102 to rotate with an angle S so as to have the major axial direction n of the directive beamforming antenna 100, i.e. the moving direction of the vehicle 102 in this embodiment, consistent to the direction A between the direction $A_1$ to the direction $A_2$. It is understood that other operations may be alternatively adopted.

As described above, a retro-directive antenna 110, which functions for focusing and amplifying electromagnetic waves received from the directive beamforming antenna 100, is installed in the target zone 112. The focused and amplified retro waves are transmitted along the reverse direction, i.e. toward where it came from. Since the electromagnetic waves are amplified by the retro-directive antenna 110, the corresponding retro waves is supposed to be more intense than waves reflected by other objects. In other words, if one sensing beam is emitted but two or more reflected waves are sent back, it is inferable that the most intense one is the corresponding retro wave returned by the retro-directive antenna 110. Furthermore, the other reflected waves will show the presence of objects which might become obstacles to the movement of the vehicle and can be referred to for estimating the positions of the obstacles. Possible collision with the obstacles can thus be avoided by, for example, guiding the vehicle to deviate from the path of the sensing beam. Whether a reflected wave is the corresponding retro wave sent back from the retro-directive antenna 110 or not can be further checked by estimating the distance of the reflective object and determining whether the reflective object is disposed in the target zone according to the distance data.

In a case that the mobile navigation is conducted in an area where multi-path reflection is not an issue, e.g. an open space, a specific electromagnetically reflective object can be used in lieu of the retro-directive antenna 110 to accomplish the guidance of the vehicle. The omission of the retro-directive antenna 110 facilitates reduction of the cost of the navigation system.

To sum up, the mobile navigation method and system according to the present invention use electromagnetic waves to implement positioning and navigation of a vehicle, and use a directive sensing beam and a retro-directive antenna in a target zone to enhance precisions of the positioning and navigation. Furthermore, information of the reflected waves can be referred to for dodging obstacles. An example of the directive beamforming antenna 100 is a radar. The mobile navigation method and system according to the present invention can be used to guide a car on a road, and in addition, guide a vehicle, a vessel or an aircraft to park into a garage, a dock or an apron safely. Accordingly, human laboring and cost can be saved, and mobile safety can be improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures. For example, in spite hardware devices are exemplified as above in order to practice the redundancy power supply system and the power control circuit according to the present invention, hardware/software hybrid modules or firmware designs may also adopted as alternatives of the devices when appropriate.

What is claimed is:

1. A mobile navigation system for guiding a moving vehicle toward a target zone, comprising:
   a directive beamforming antenna carried by and moving with the vehicle, emitting a first sensing beam in a first direction at a first time point and emitting a second sensing beam in a second direction different from the first direction at a second time point later than the first time point toward the target zone, wherein a coverage area of the first sensing beam and a coverage area of the second sensing beam have a partially overlapping area;
   an electromagnetic wave reflector installed in the target zone, transmitting back a first retro wave when receiving the first sensing beam and transmitting back a second retro wave when receiving the second sensing beam back; and
   a processor electrically coupled to the directive beamforming antenna, and when receiving both the first retro wave and the second retro wave, determining a direction where the vehicle will be guided to move according to information of the first retro wave and information of the second retro wave,
   wherein the direction where the vehicle will be guided to move lies in the partially overlapping area between the first direction and the second direction.

2. The system according to claim 1, wherein the electromagnetic wave reflector is a retro-directive antenna.

3. The system according to claim 1, wherein the processor identifies the first retro wave and the second retro wave among a plurality of reflected waves according to intensities of the reflected waves.

4. The system according to claim 1, wherein the first sensing beam and the second sensing beam are successively emitted, and the processor dynamically determines an interval between the first time point and the second time point according to a waiting duration from the emission of the first sensing beam to the receipt of the first retro wave.

5. A mobile navigation method for guiding a moving vehicle toward a target zone, comprising:
   emitting a first sensing beam from the moving vehicle in a first direction at a first time point and emitting a second sensing beam from the vehicle in a second direction different from the first direction at a second time point later than the first time point toward the target zone, wherein a coverage area of the first sensing beam and a coverage area of the second sensing beam have a partially overlapping area;
   transmitting a first retro wave from the target zone to the vehicle when receiving the first sensing beam and transmitting a second retro wave from the target zone to the vehicle when receiving the second sensing beam; and
   determining a direction where the vehicle will be guided to move according to information of the first retro wave and information of the second retro wave when receiving both the first retro wave and the second retro wave,
   wherein the direction where the vehicle will be guided to move lies in the partially overlapping area between the first direction and the second direction.

6. The method according to claim 5, wherein the electromagnetic wave reflector is a retro-directive antenna.

7. The method according to claim 5, wherein the first retro wave and the second retro wave are identified among a plurality of reflected waves according to intensities of the reflected waves.

8. The method according to claim 5, further comprising dynamically determining an interval between the first time point and the second time point according to a waiting duration from the emission of the first sensing beam to the receipt of the first retro wave.

9. The method according to claim 5, further comprising: if no first retro wave is received in response to the first sensing beam within a default period of time from the first time point, adjusting the first direction and re-emitting a sensing beam in the adjusted direction from the moving vehicle.

10. The method according to claim 6, further comprising: if no second retro wave is received in response to the second sensing beam within a default period of time from the second time point, adjusting the second direction and re-emitting a sensing beam in the adjusted direction from the moving vehicle.

11. The method according to claim 6, further comprising: adjusting the first direction and re-emitting a sensing beam in the adjusted direction from the moving vehicle after the vehicle is guided to move in the partially overlapping area between the first direction and the second direction.

* * * * *